United States Patent
Leme et al.

(10) Patent No.: US 8,028,573 B2
(45) Date of Patent: Oct. 4, 2011

(54) TOOL SET FOR THE INSERTION OF A FLOW MONITORING DEVICE IN A FLUID PIPING, AND IMPLEMENTATION METHOD THEREFORE

(75) Inventors: David Leme, Paris (FR); Jean-Francois Daymard, Blanquefort (FR)

(73) Assignee: GDF Suez (FR)

( * ) Notice: Subject to any disclaimer, the term of this patent is extended or adjusted under 35 U.S.C. 154(b) by 326 days.

(21) Appl. No.: 12/466,837

(22) Filed: May 15, 2009

(65) Prior Publication Data
US 2010/0000313 A1      Jan. 7, 2010

(30) Foreign Application Priority Data

May 20, 2008 (FR) ...................... 08 53278

(51) Int. Cl.
*G01F 15/06* (2006.01)
(52) U.S. Cl. .................................. 73/272 R
(58) Field of Classification Search .............. 73/272 R, 73/866.5; 137/460, 93; 123/574
See application file for complete search history.

(56) References Cited

U.S. PATENT DOCUMENTS

| | | | | |
|---|---|---|---|---|
| 2,926,690 A | * | 3/1960 | Martin | 137/460 |
| 3,898,918 A | * | 8/1975 | Carter | 138/93 |
| 4,418,572 A | * | 12/1983 | Prange | 73/866.5 |
| 5,293,898 A | * | 3/1994 | Masloff | 137/517 |
| 5,477,886 A | * | 12/1995 | Van Beugen et al. | 138/93 |
| 5,482,076 A | * | 1/1996 | Taylor et al. | 137/318 |
| 5,697,351 A | * | 12/1997 | Schumacher | 123/574 |
| 6,062,264 A | * | 5/2000 | Dickson | 138/98 |
| 6,962,165 B2 | * | 11/2005 | Delprat et al. | 137/498 |

FOREIGN PATENT DOCUMENTS

| | | |
|---|---|---|
| DE | 197 23 700 A1 | 12/1998 |
| FR | 2870316 A1 | 11/2005 |
| FR | 2916511 | 11/2008 |
| WO | WO 98/20295 | 5/1998 |

OTHER PUBLICATIONS

Rapport De Recherche Préliminaire of French Application No. 0853278 mailed Dec. 16, 2008.
Opinion Ecrite Sur La Brevetabilite De L'Invention of French Application No. 0853278.

* cited by examiner

*Primary Examiner* — Jewel V Thompson
(74) *Attorney, Agent, or Firm* — Seyfarth Shaw LLP; Richard P. Gilly (57) ABSTRACT

The invention particularly relates to a tool set for setting-up a flow monitoring device (1) in a fluid piping (K).
This tool set comprises at least one hollow semi-flexible hose (31) provided with a jack (33) bearing the device (1) in a sheath, a pump (32) monitoring the pressure inside the hose, a support member (4) slidingly crossed by the hose (31), and an introduction airlock (5) carried by the support member and making it possible to sealingly insert the hose in the piping (K).

15 Claims, 5 Drawing Sheets

TOOL SET FOR THE INSERTION OF A FLOW MONITORING DEVICE IN A FLUID PIPING, AND IMPLEMENTATION METHOD THEREFORE

CROSS REFERENCE TO RELATED APPLICATION

This application claims priority from French Application No. 0853278 filed May 20, 2008, which application is incorporated herein by reference.

BACKGROUND

The invention generally relates to the techniques for managing and operating fluid-dispensing networks, particularly gas.

SUMMARY

More specifically, according to a first aspect, the invention relates to a tool set for setting up, in a fluid piping, a flow monitoring device comprising a hollow body provided with an upstream end and a downstream end, a valve integrated to the hollow body and designed to close in response to a fluid flow rate in the piping exceeding a maximal boundary flow rate, a cup-type seal member arranged at the downstream end of the hollow body, and a plurality of elastic legs connected to the hollow body between the upstream and downstream ends of this hollow body and designed to distend elastically at their free ends turned towards the downstream end of the hollow body, once the device set in the piping, this tool set comprising a sheath in which the device is initially inserted by the downstream end of the hollow body in a preparatory configuration in which the seal and legs are radially folded and elastically stressed in the sheath.

Figure 3:
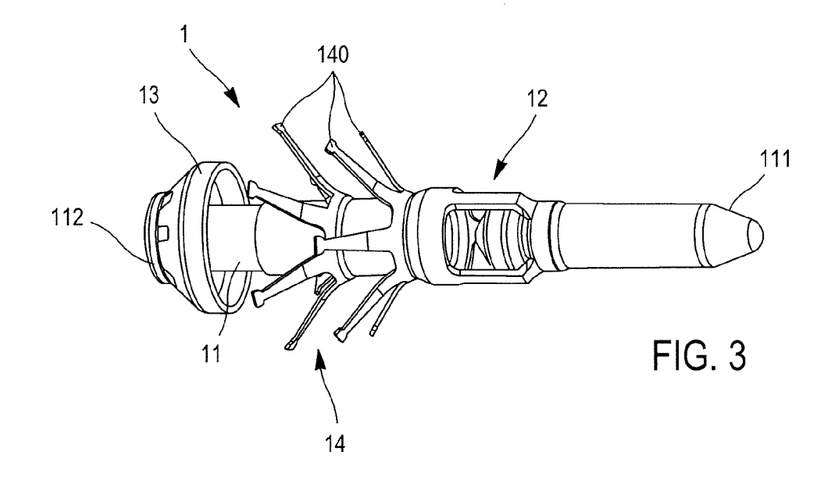
FIG. 3 is a perspective view of a flow monitoring device whereof the tool set of the invention makes it possible for its fitting in a piping.

A flow monitoring device of the related type is shown in FIG. 3 and described in patent application FR 2 916 511.

After having been partially introduced in a sheath of radial contention, as described in patent documents FR 2 870 316 and FR 2 916 511, each device of this type should be set in the piping whereof it is intended to monitor the flow.

In this context, the invention has particularly the purpose of providing a tool set making it possible to proceed with this installation surely and easily.

To this end, the tool set of the invention, which further conforms to the generic definition thereof given in the preamble above, is substantially characterized in that it further comprises: a semi-flexible hollow hose, a pump connected to a first end of the hose, and adapted to monitor the pressure inside the hose, a manometer subjected to the pressure prevailing inside the hose, a jack mounted at a second end of the hose and comprising a cylinder subjected to the pressure prevailing inside the hose and a piston, the sheath being screwed on the cylinder of this jack on the downstream end side of the device, a support member a first end of which bears a metric counter slidingly crossed by the hose and a second end of which is also slidingly crossed by the hose, and an introduction airlock comprising at least one pipe crossed by the end of the hose bearing the jack and exhibiting at least one rectilinear and rigid terminal guiding section, one first end of the pipe being carried by the support member and including a retaining ring such as a stuffing box slidingly crossed by the hose, and a second end of the pipe comprising the terminal guiding section and being adapted to be sealingly screwed on an accessible portion of the piping disposed in the extension of this terminal guiding section, the hose exhibiting, between the two supporting ends, a longitudinal section accessible and able to be pushed or pulled in order to introduce the jack in the piping or to retrieve it therefrom, and the piston of the jack adopting, in the cylinder of the jack, a position which depends on the pressure inside the hose and being adapted to selectively eject the device out of the sheath.

However, it is judicious to achieve the tool set of the invention such that it may further comprise at least one bypass, a shut-off valve and two test valves, that the bypass exhibits two ends the first of which being connected to the airlock, that the shut-off valve be set on the bypass between the ends of this bypass, that the two test valves connect, parallely to each other, the second end of the bypass to atmospheric pressure, and that the first and second test valves exhibit different respective first and second passage sections the first of which allows a fluid flow rate from the piping at most equal to the maximal boundary flow rate, and the second of which allows, from the piping, a fluid flow rate higher than the maximal boundary flow rate.

The pipe of the airlock advantageously exhibits an elbow extending between the retaining ring and the terminal guiding section, the bypass thus being connected to the airlock between the retaining ring and the elbow.

Preferably, the bypass is also provided with an inflation valve arranged between the first end of the bypass and the shut-off valve.

The pipe of the airlock may exhibit, spaced apart from its terminal guiding section, an inner stopper and an inner diameter providing, at the same time, a housing for the jack as well as a fluid flow path around the jack, the inner stopper blocking the movement of the jack towards the retaining ring without blocking the fluid flow.

The tool set of the invention may also comprise a chassis and a spool whereon the hose is wound, this spool being rotationally supported on the chassis.

This tool set can also comprise a collapsible rod designed to adapt to the support member and constitute a stand for this support member.

In the case where the chassis belongs to a wheel mallet, the collapsible rod may be designed to adapt to the mallet and constitute a handle to facilitate the displacement of this mallet.

The invention also relates to a method for implementing the above described tool set to insert in a fluid piping a flow monitoring device partially introduced under radial stress into a sheath, this method being characterized in that it comprises the steps of: checking the absence of the flow monitoring device in the piping; closing the branch valve which is provided to the accessible portion of the piping; opening a downstream end of the accessible portion of the piping arranged downstream from the branch valve; screwing the second end of the pipe of the airlock on the downstream end of the accessible portion of the piping; pushing the hose in the piping to make the flow monitoring device progress through the branch valve and the accessible portion; detecting a resistance against the progression of the device, which indicates a surpassing of its set-up point; pulling the hose over a predetermined distance to place the device at its set-up point; actuating the pump in order to increase the pressure inside the hose; waiting a predetermined period of time; and pulling the hose again to insert the jack in the airlock.

The pulling step of the hose may be carried out until the jack is blocked by the inner stopper, and the method may further comprise the steps of: opening the shut-off valve of the bypass; opening the first test valve; checking that the fluid is flowing in the piping and reaches this first test valve; opening the second test valve; checking that the fluid is no longer flowing in the piping and that it has not reached the test valve; and closing the test valves and the shut-off valve of the bypass.

In the case where the method is implemented with the most complete tool set, this method further comprises the steps of injecting fluid in the airlock through the inflation valve until reaching a predetermined pressure in the airlock; opening the shut-off valve of the bypass; opening the first test valve; checking that the fluid is flowing in the piping and reaches this first test valve; closing the first test valve and the shut-off valve of the bypass; closing the branch valve of the accessible portion of the piping; unscrewing the second end of the pipe of the airlock from the downstream end of the accessible portion of the piping; and opening the branch valve again.

BRIEF DESCRIPTION OF THE DRAWINGS

Other characteristics and advantages of the invention will become more apparent in the following description thereof, given by way of a non limitative example, with reference to the accompanying drawings, in which.

DETAILED DESCRIPTION

As previously noted, the invention relates to a tool set making it possible to set up (FIG. 1) a flow monitoring device 1 in a fluid piping K, typically constituted of a gas dispensing installation.

The flow monitoring device 1 of the related type has been shown in patent application FR 2 916 511, and is also illustrated in FIG. 3.

Such a device 1 typically comprises a hollow body 11, a valve 12, a cup-type seal member 13 and a plurality of elastic legs 14.

The hollow body 11 exhibits an upstream end 111 forming an introduction nose, and a downstream end 112 bearing the cup-type seal member 13.

The valve 12, installed in the hollow body 11, is designed to close and to correspondingly shut-off the hollow body 11 when the fluid flow rate in piping K exceeds a predetermined boundary value.

The cup-type seal member 13, surrounding the hollow body 11 and that is applied on the inner wall of piping K, forces the fluid flowing in the piping to cross the hollow body 11, the fluid flow thus being blocked when valve 12 shuts-off the hollow body 11.

The elastic legs 14, that are connected to the hollow body 11 between the upstream and downstream ends 111, 112 of this hollow body 11, are designed to distend elastically, by their free ends 140 turned towards the downstream end 112 of hollow body 11, once the device 1 installed in the piping, and thus to hold this device in place in the piping.

However, in order to be inserted in a piping, such a device 1 should have been partially introduced in a sheath 2 (FIG. 9) beforehand, the seal 13 and the legs 14 thus being radially folded and elastically stressed into this sheath 2.

Figure 1:
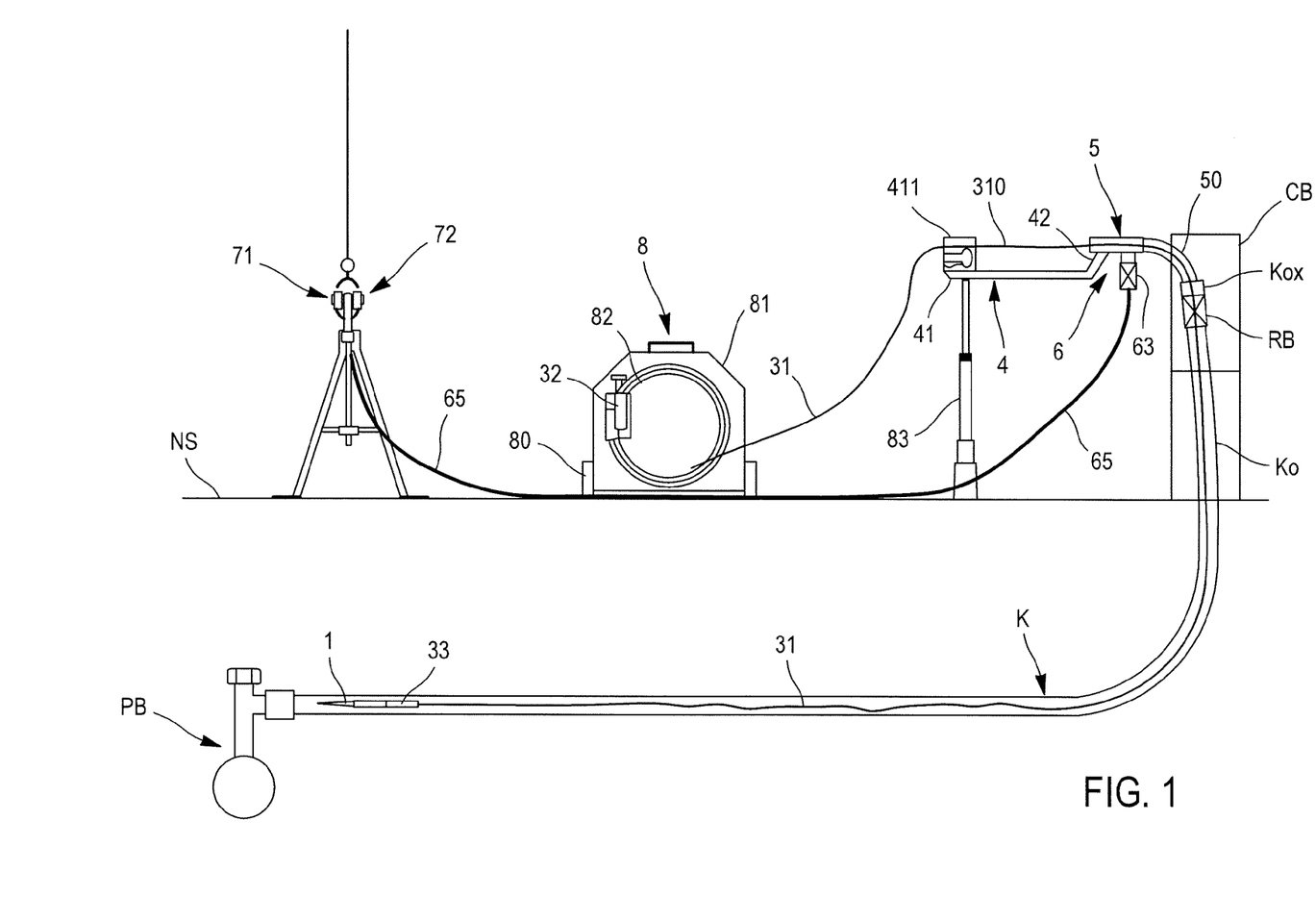
FIG. 1 is a schematic view of a tool set according to a preferred embodiment of the invention, shown in its privileged application context.
Figure 2:
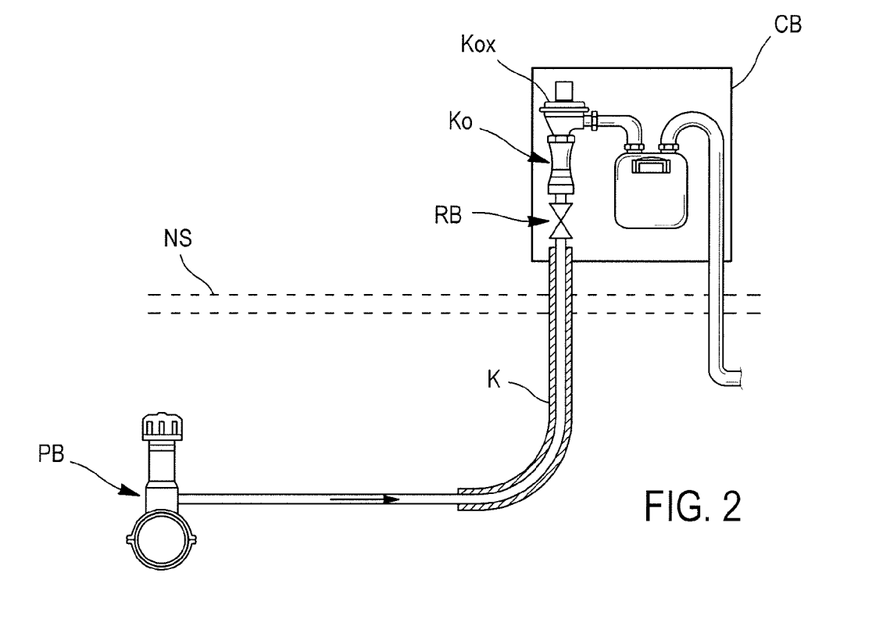
FIG. 2 is a schematic view of a piping to which the tool set of the invention is typically adapted.

The tool set of the invention is particularly well adapted for the insertion of a flow monitoring device 1 such as shown in FIG. 3 in a gas dispensing installation such as illustrated in FIG. 2 and more schematically in FIG. 1.

Such an installation typically comprises a branching plug PB supplying gas to a branching box CB through a branching pipe, which, in this case, constitutes piping K.

Above ground level NS, the piping K exhibits a piping accessible portion Ko whereon a branch valve RB is installed making it possible to isolate an end Kox of the portion Ko from the branching plug PB, located the most downstream from the branching plug PB in the direction of gas flow.

The tool set of the invention makes it possible, as is shown in FIG. 1, to insert in the piping K, through the branch valve RB, and having introduced it in the downstream end Kox of the piping accessible portion Ko, a flow monitoring device 1 such as shown in FIG. 3.

Apart from the sheath 2, such tool set particularly comprises a hollow semi-flexible hose 31, a pump 32, a manometer 321, a jack 33, a support member 4, a metric counter 411, and an introduction airlock 5.

The pump 32, that is connected to a first end 311 of the hose 31, makes it possible to monitor the pressure inside the hose 31, i.e., make it vary as required.

The manometer 321, which is preferably mounted on the pump 32, is subjected to the pressure prevailing inside the hose 31 and thus makes it possible to know this pressure at any time.

The jack 33 (FIG. 8), which is installed at the second end 312 of the hose 31, comprises a cylinder 331 subjected to the pressure prevailing inside the hose 31 and in which slides a piston 332.

Figure 9:
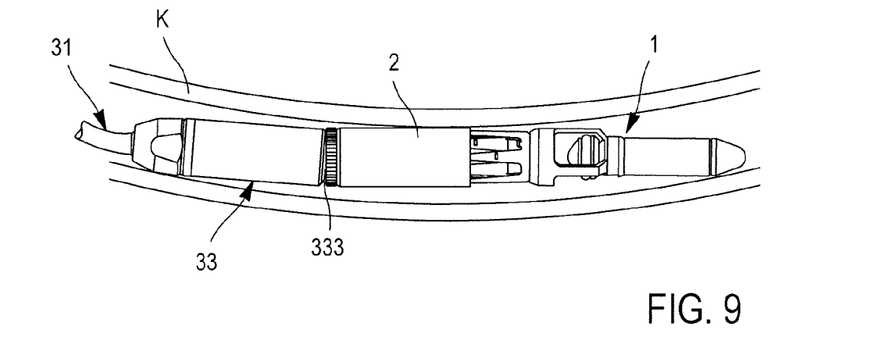
FIG. 9 illustrates on an enlarged scale a jack used in a tool set according to the invention, shown in a setting-up phase, in a piping, of a flow monitoring device such as shown in FIG. 3.

As shown by a comparison of FIGS. 3 and 9, the sheath 2 is connected, for example by screwing, to cylinder 331 of jack 33 on the downstream end 112 side of device 1.

Hence, the piston 332 which adopts, in cylinder 331 of jack 33, a position depending on the pressure prevailing inside hose 31, is thus adapted to eject controllably the device 1 out of sheath 2.

Figure 8:
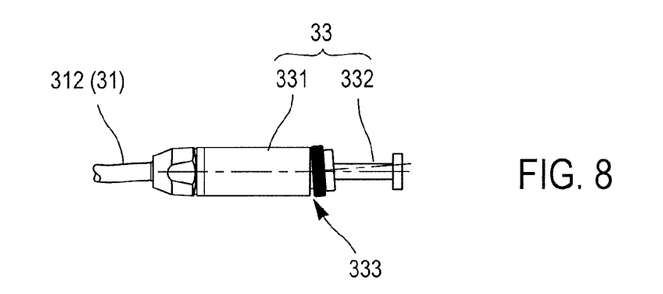
FIG. 8 represents a jack used in the tool set shown in FIG. 7 and not shown on this figure.

In order to facilitate its passage in the curves of piping K, jack 33 may exhibit one or more joints 333, as specifically show FIGS. 8 and 9.

Figure 4:
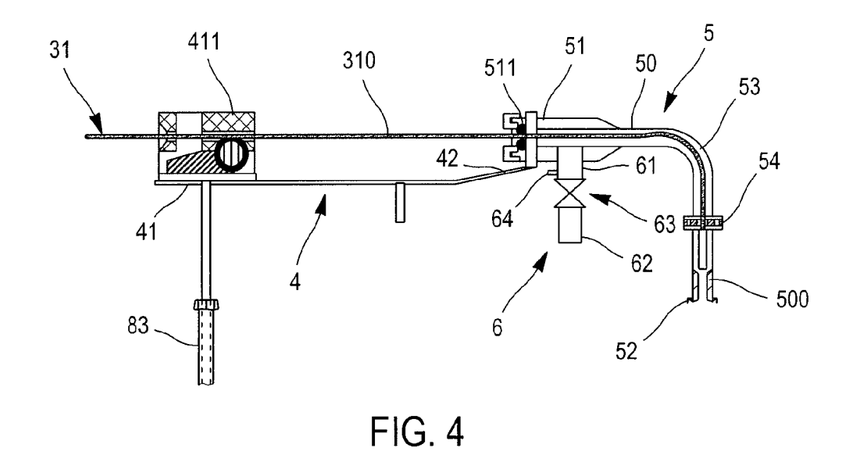
FIGS. 4 and 5 are schematic partial cross-section views of a tool set according to a preferred embodiment of the invention.
Figure 5:
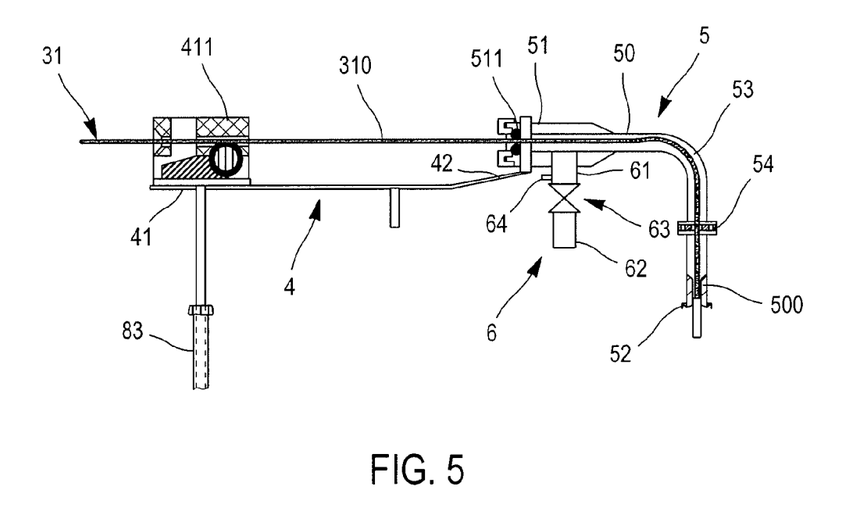

The metric counter 411, which is carried by a first end 41 of the support member 4, is slidingly crossed by the hose 31 and measures the range of any sliding movement of this hose in this counter, taking into account the direction of this sliding.

The airlock 5 is carried by a second end 42 of the support member 4 which is also slidingly crossed by the hose 31.

Between both ends 41 and 42 of the support member 4, hose 31 exhibits a longitudinal section 310 to which any operator may access and can be pushed or pulled to make it possible to introduce the jack 33 in piping K or to retrieve it therefrom.

The introduction airlock 5 particularly comprises a pipe 50 crossed by the end 312 of the hose 31 bearing the jack 33.

The first end 51 of this pipe 50 is carried by the end 42 of the support member 4 and comprises a retaining ring 511, such as a stuffing box, that is slidingly crossed by the hose 31.

This pipe 50 further comprises, at its second end 52, an inner cladding forming a rectilinear and rigid terminal guiding section 500, adapted to guide the jack 33 precisely along its axis.

The second end 52 of pipe 50 is further designed to be sealingly screwed on the end Kox of the accessible portion Ko of piping K such that this portion of piping Ko be arranged exactly in the extension of the terminal guiding section 500 of pipe 50.

Figure 10:
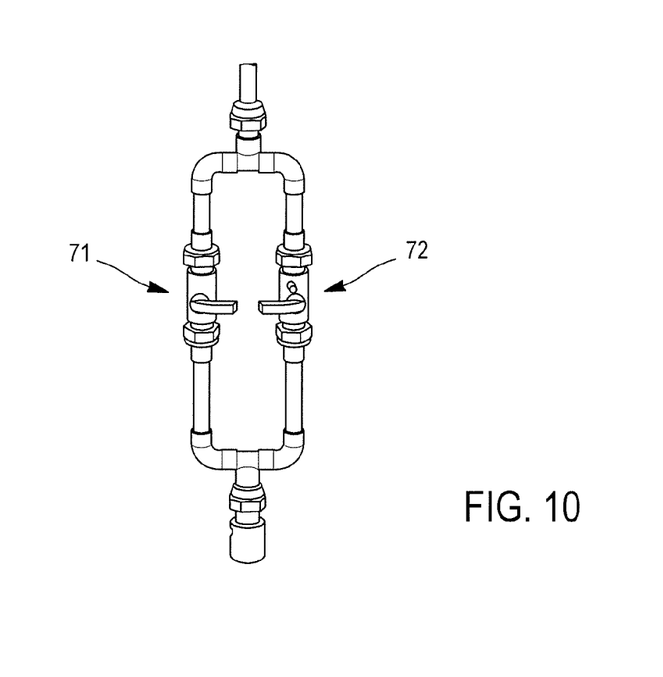
FIG. 10 shows the arrangement of test valves used in a tool set according to the preferred embodiment of the invention.

In its preferred embodiment, the tool set of the invention further comprises a bypass 6, a shut-off valve 63 and two test valves 71 and 72.

The bypass 6 communicates with the airlock 5 whereto it is connected by its first end 61.

The shut-off valve 63 is installed on the bypass 6 between ends 61 and 62 of this bypass 6, thus enabling to isolate these two ends from each other.

The two test valves 71 and 72, which are connected to the second end 62 of bypass 6, for example through a flexible tube 65, connect, parallely to each other, this second end 62 of the bypass 6 to atmospheric pressure.

The test valves 71 and 72, exhibit different passageway sections.

More precisely, the first test valve 71 allows a fluid flow rate, coming from piping K, at most equal to the maximal boundary flow rate that characterizes the absence of anomaly, whereas the second test valve 72 allows a fluid flow rate, coming from piping K, higher than this maximal boundary flow rate.

Pipe 50 of airlock 5 exhibits, for example, an elbow 53 that extends between the retaining ring 511 and the terminal guiding section 500, the bypass 6 being connected to airlock 5 between this retaining ring 511 and this elbow 53.

Furthermore, as specifically shown by FIGS. 4 and 5, the bypass 6 is preferably fitted with an inflation valve 64 arranged between the first end 61 of bypass 6 and the shut-off valve 63.

Spaced apart from its terminal guiding section 500, the pipe 50 of airlock 5 advantageously exhibits (FIGS. 6A and 6B) an inner stopper 54 adapted to block any backward movement of jack 33 in the direction of the retaining ring 511.

Figure 6A:
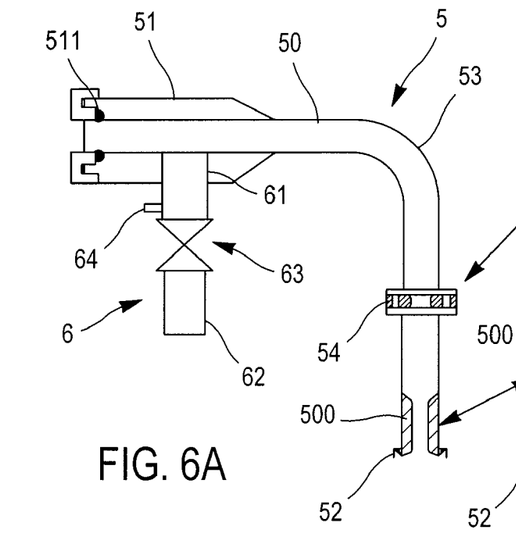
FIGS. 6A to 6C are enlarged scale views of details of the tool set shown in FIGS. 4 and 5.
Figure 6B:
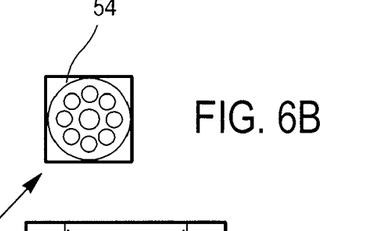
Figure 6C:
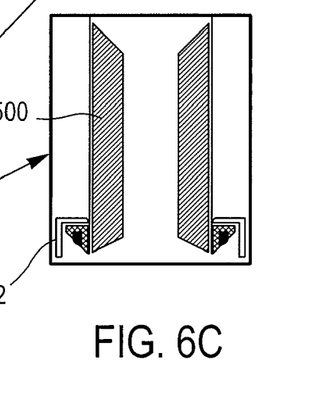

Between this inner stopper 54 and its terminal guiding section 500, the pipe 50 exhibits an inner diameter offering at the same time a housing to the jack 33 and a fluid flow path around the jack 33, the inner stopper 54 being itself designed not to block this fluid flow.

Figure 7:
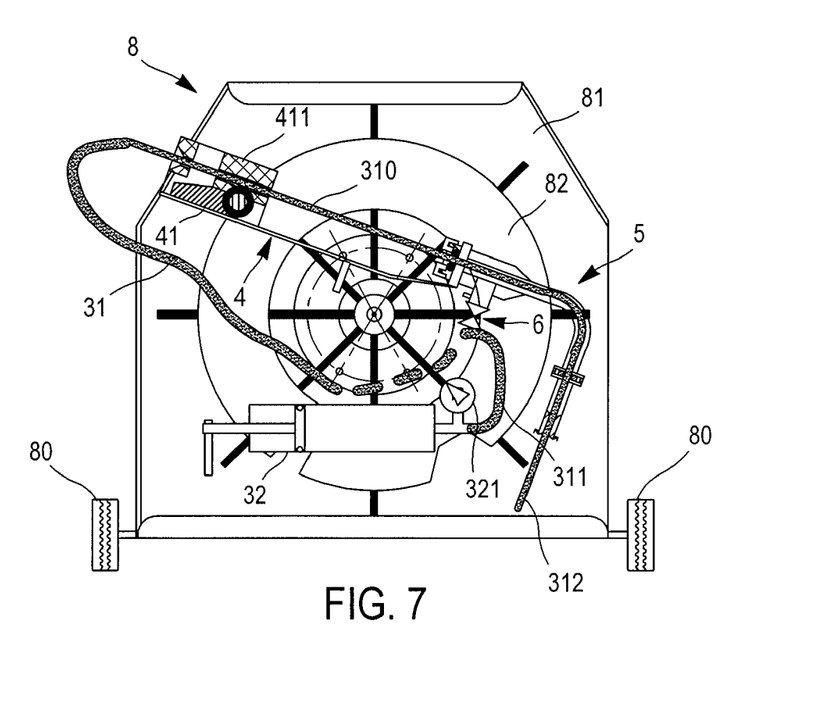
FIG. 7 is a partial schematic view according to the preferred embodiment of the invention.

As shown by FIGS. 1 and 7, the tool set of the invention may still comprise a chassis 81 and a spool 82 whereon the hose 31 is wound, this spool 82 being rotationally supported on the chassis 81.

In the preferred embodiment of the invention, the chassis 81 belongs to a mallet 8 which is provided with wheels 80.

A collapsible rod 83, shown on FIGS. 1, 4 and 5, can be provided to adapt to the support member 4 and constitute a stand for this support member 4, as well as to adapt to the mallet 8 and constitute a handle for facilitating the displacement of this mallet 8.

The invention also relates to a method for implementing the tool set as described previously in view of inserting, in a gas piping K, a flow monitoring device 1 partially introduced under radial stress in a sheath 2.

This method particularly comprises the following steps of:

(a) checking the absence of a flow monitoring device 1 in the piping K;

(b) closing the branch valve RB with which the accessible portion Ko of piping K is equipped;

(c) opening the downstream end Kox of the accessible portion Ko of piping K, i.e., the end of this piping portion that is arranged downstream from the branch valve RB;

(d) screwing the second end 52 of the pipe 50 of airlock 5 on the downstream end Kox of this accessible portion Ko of piping K;

(e) acting on the accessible longitudinal section 310 of hose 31 to push this hose in piping K and make the flow monitoring device 1 progress therein through the branch valve RB and the accessible portion Ko;

(f) detecting a resistance against the progression of device 1, this resistance indicating that device 1 abuts against the vertical wall of the branching plug PB and has thus surpassed its optimal set-up point in piping K;

(g) pulling the hose 31 over a predetermined distance to move back device 1 and replace it at its optimal set-up point in piping K;

(h) actuating the pump 32 to increase the pressure inside hose 31;

(i) waiting a predetermined period of time to allow the piston 332 of jack 33 to overcome, under the effect of the pressure prevailing inside hose 31, the frictional forces that tend to hold back device 1 in sheath 2, and to move by ejecting this device out of this sheath; and (j) pulling hose 31 again to insert the jack 33 in the airlock 5 until it be blocked by the stopper 54.

In the preferred case in which the installation of the device 1 in the piping K includes checking the performance of this device, the method of the invention further comprises the following steps of:

(k) opening the shut-off valve 63 of bypass 6;

(l) opening the first test valve 71, which enables the piping K to communicate with outside air by allowing only a normal gas flow rate;

(m) checking that the gas is flowing in the piping K and reaches this first test valve 71, which confirms that the device 1 does not obstruct piping K and that the valve 12 allows the passage of any gas flow rate, the value of which is lower than the anomaly threshold;

(n) opening the second test valve 72, which enables piping K to communicate with outside air by allowing an unusually high gas flow rate;

(o) checking that the fluid is no longer flowing in piping K and does not reach the second test valve 72, which confirms that the valve 12 correctly fulfills its function; and (p) closing the test valves 71, 72 and the shut-off valve 63 of bypass 6.

If step (o) is actually achieved successfully, device 1 is brought into a configuration wherein the valve 12 isolates the branching box CB from the branching plug PB.

Thus, it is usually necessary to replace device 1 in a configuration in which the valve 12 allows the passage of any normal gas flow rate.

To this end, the method of the invention thus comprises the following additional steps of:

(q) injecting gas or air in airlock 5 through the inflation valve 64, until the airlock 5 and the piping K reach a predetermined pressure for which the valve 12 of device 1 opens again;

(r) opening the shut-off valve 63 of bypass 6;

(s) opening the first test valve 71;

(t) checking that the fluid is flowing in piping K and reaches this first test valve 71;

(u) closing the first test valve 71 and the shut-off valve 63 of bypass 6;

(v) closing the branch valve RB of the accessible portion Ko of piping K;

(w) unscrewing the second end 52 of pipe 50 of airlock 5 from the downstream end Kox of the accessible portion Ko of piping K;

(x) closing the downstream end Kox of the accessible portion Ko of piping K; and (y) opening the branch valve RB again.

Although various techniques are known for the implementation of step (a), a man skilled in the art will understand upon reading the present description that this step may also be carried out by using the tool set of the invention and implementing the sequence of steps (k) to (o) as described previously.

The invention claimed is:

1. A tool set to set-up, in a fluid piping (K), a flow monitoring device comprising a hollow body provided with an upstream end and a downstream end, a valve integrated to the hollow body and designed to close in response to a fluid flow rate in the piping (K) exceeding a maximal boundary flow rate, a cup-type seal member arranged at the downstream end of hollow body, and a plurality of elastic legs connected to the hollow body between the upstream and downstream ends of this hollow body and designed to elastically distend at their free ends turned towards the downstream end of the hollow body, once the device is installed in the piping, this tool set comprising a sheath in which the device is initially inserted from the downstream end of hollow body in a preparatory configuration in which the seal and legs are radially folded and elastically stressed into the sheath, this tool set being characterized in that it further comprises a hollow semi-flexible hose, a pump connected to a first end of the hose and adapted to monitor the pressure prevailing inside the hose, a manometer subjected to the pressure prevailing inside the hose, a jack installed at a second end of the hose and comprising a cylinder subjected to the pressure prevailing inside the hose and a piston, the sheath being screwed on the cylinder of this jack on the downstream end side of said device, a support member a first end of which bears a metric counter slidingly crossed by the hose and a second end of which is also slidingly crossed by the hose, and an introduction airlock comprising at least one pipe crossed by the end of hose bearing the jack and exhibiting at least one rectilinear and rigid terminal guiding section, a first end of the pipe being carried by the support member and comprising a retaining ring such as a stuffing box slidingly crossed by the hose, and a second end of the pipe comprising the terminal guiding section and being adapted to be sealingly screwed on an accessible portion (Ko) of piping (K) arranged in the extension of this terminal guiding section, the hose exhibiting, between the two ends of the support member, a longitudinal section accessible and able to be pushed or pulled to introduce said jack into said piping (K) or retrieve it therefrom, and the piston of said jack adopting in the cylinder of said jack a position which depends on the pressure inside the hose and being adapted to selectively eject the device out of the sheath.

2. The tool set according to claim 1, characterized in that it further comprises at least one bypass, a shut-off valve and two test valves, in that the bypass exhibits two ends, the first of which is connected to the airlock, in that the shut-off valve is fitted on the bypass between the ends of said bypass, in that the two test valves connect, parallely to each other, the second end of bypass to atmospheric pressure, and in that the first and second test valves exhibit different, respective first and second passage sections, the first of which allows a fluid flow rate at most equal to the maximal boundary flow rate from piping (K), and the second of which allows a fluid flow rate higher that the maximal boundary flow rate from piping (K).

3. The tool set according to claim 2, characterized in that the pipe of airlock exhibits an elbow extending between the retaining ring and the terminal guiding section, and in that the bypass is connected to said airlock between the retaining ring and the elbow.

4. The tool set according to claim 2, characterized in that the bypass is provided with an inflation valve arranged between the first end of bypass and the shut-off valve.

5. The tool set according to claim 2, characterized in that the pipe of airlock exhibits, spaced apart from its terminal guiding section, an inner stopper and an inner diameter providing both a housing to the jack as well as a fluid flow path around the jack, and in that the inner stopper blocks the movement of said jack towards the retaining ring without blocking the fluid flow.

6. The tool set according to claim 1, characterized in that it comprises a chassis and a spool on which said hose is wound, this spool being rotationally supported on the chassis.

7. The tool set according to claim 1, characterized in that it further comprises a collapsible rod designed to adapt to the support member and constitute a stand for this support member.

8. The tool set according to claims 6, characterized in that the chassis belongs to a wheel mallet and in that the collapsible rod is designed to adapt to the mallet and constitute a handle for facilitating the displacement of this mallet.

9. The tool set according to claims 7, characterized in that the chassis belongs to a wheel mallet and in that the collapsible rod is designed to adapt to the mallet and constitute a handle for facilitating the displacement of this mallet 10. The tool set according to claim 1, characterized in that the jack exhibits at least one joint.

11. A method for implementing the tool set according to claim 1, in a fluid piping (K), a flow monitoring device partially introduced under radial stress in a sheath, characterized in that it comprises the steps of: checking the absence of flow monitoring device (1) in the piping; closing the branch valve (RB) which the accessible portion (Ko) of piping (K) is provided with; opening a downstream end (Kox) of the accessible portion (Ko) of piping (K) arranged downstream from the branch valve (RB); screwing the second end of the pipe of airlock on the downstream end (Kox) of the accessible portion (Ko) of piping (K); pushing the hose into the piping (K) to make the flow monitoring device progress through the branch valve (RB) and the accessible portion (Ko); detecting a resistance against the progression of device, which indicates a surpassing of its set-up point; pulling the hose over a predetermined distance to bring said device to its set-up point; actuating the pump in order to increase the pressure in said hose; waiting a predetermined time period; and pulling said hose again in order to insert jack in airlock.

12. A method for implementing the tool set according to claim 2, in a fluid piping (K), a flow monitoring device partially introduced under radial stress in a sheath, characterized in that it comprises the steps of: checking the absence of flow monitoring device (1) in the piping; closing the branch valve (RB) which the accessible portion (Ko) of piping (K) is provided with; opening a downstream end (Kox) of the accessible portion (Ko) of piping (K) arranged downstream from the branch valve (RB); screwing the second end of the pipe of airlock on the downstream end (Kox) of the accessible portion (Ko) of piping (K); pushing the hose into the piping (K) to make the flow monitoring device progress through the branch valve (RB) and the accessible portion (Ko); detecting a resistance against the progression of device, which indicates a surpassing of its set-up point; pulling the hose over a predetermined distance to bring said device to its set-up point, actuating the pump in order to increase the pressure in said hose; waiting a predetermined time period; and pulling said hose again in order to insert jack in airlock, characterized in that the pulling step of the hose is carried out until the jack is blocked by the inner stopper; opening the shut-off valve of said bypass; opening the first test valve; checking that the fluid is flowing in piping (K) and reaches this first test valve; opening the second test valve; checking that the fluid is no longer flowing in piping (K) and does not reach the second test valve; and closing test valves and the shut-off valve of said bypass.

13. The method according to claim 12, characterized in that it further comprises the steps of injecting fluid in airlock through the inflation valve until reaching a predetermined pressure in airlock; opening the shut-off valve of said bypass; opening the first test valve; checking that the fluid is flowing in said piping (K) and reaches this first test valve; closing the first test valve and the shut-off valve of said bypass; closing the branch valve (RB) of the accessible portion (Ko) of piping (K); unscrewing the second end of pipe of airlock from the downstream end (Kox) of the accessible portion (Ko) of piping (K); closing the downstream end (Kox) of the accessible portion (Ko) of said piping (K); and opening the branch valve (RB) again.

14. A method for implementing the tool set according to claim 5, in a fluid piping (K), a flow monitoring device partially introduced under radial stress in a sheath, characterized in that it comprises the steps of: checking the absence of flow monitoring device (1) in the piping; closing the branch valve (RB) which the accessible portion (Ko) of piping (K) is provided with; opening a downstream end (Kox) of the accessible portion (Ko) of piping (K) arranged downstream from the branch valve (RB); screwing the second end of the pipe of airlock on the downstream end (Kox) of the accessible portion (Ko) of piping (K); pushing the hose into the piping (K) to make the flow monitoring device progress through the branch valve (RB) and the accessible portion (Ko); detecting a resistance against the progression of device, which indicates a surpassing of its set-up point; pulling the hose over a predetermined distance to bring said device to its set-up point, actuating the pump in order to increase the pressure in said hose; waiting a predetermined time period; and pulling said hose again in order to insert jack in airlock, characterized in that the pulling step of the hose is carried out until the jack is blocked by the inner stopper; opening the shut-off valve of said bypass; opening the first test valve; checking that the fluid is flowing in piping (K) and reaches this first test valve; opening the second test valve; checking that the fluid is no longer flowing in piping (K) and does not reach the second test valve; and closing test valves and the shut-off valve of said bypass.

15. The method according to claim 14, characterized in that it further comprises the steps of injecting fluid in airlock through the inflation valve until reaching a predetermined pressure in airlock; opening the shut-off valve of said bypass; opening the first test valve; checking that the fluid is flowing in said piping (K) and reaches this first test valve; closing the first test valve and the shut-off valve of said bypass; closing the branch valve (RB) of the accessible portion (Ko) of piping (K); unscrewing the second end of pipe of airlock from the downstream end (Kox) of the accessible portion (Ko) of piping (K); closing the downstream end (Kox) of the accessible portion (Ko) of said piping (K); and opening the branch valve (RB) again.

* * * * *